(12) United States Patent
Liu et al.

(10) Patent No.: US 11,119,684 B2
(45) Date of Patent: Sep. 14, 2021

(54) METHOD AND APPARATUS FOR TRANSMITTING DATA, AND AN ELECTRONIC DEVICE THEREOF

(71) Applicant: Lenovo (Beijing) Co., Ltd., Beijing (CN)

(72) Inventors: Liqiang Liu, Beijing (CN); Gang He, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 72 days.

(21) Appl. No.: 16/234,958

(22) Filed: Dec. 28, 2018

(65) Prior Publication Data

US 2019/0205057 A1 Jul. 4, 2019

(30) Foreign Application Priority Data

Jan. 2, 2018 (CN) .......................... 201810000683.9

(51) Int. Cl.
*G06F 3/06* (2006.01)
*G06F 16/16* (2019.01)

(52) U.S. Cl.
CPC .......... *G06F 3/0647* (2013.01); *G06F 3/0604* (2013.01); *G06F 3/0605* (2013.01); *G06F 3/067* (2013.01); *G06F 3/0671* (2013.01); *G06F 16/16* (2019.01)

(58) Field of Classification Search
CPC ......... G06F 1/00–3296; G06F 5/00–16; G06F 3/00; G06F 3/06–0689; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883;
(Continued)

(56) References Cited

U.S. PATENT DOCUMENTS 7,246,258 B2 * 7/2007 Chen .................... G06F 11/2082
714/20
7,962,739 B2 * 6/2011 Childs ................. G06F 11/1417
713/1
(Continued)

FOREIGN PATENT DOCUMENTS

CN 1529857 A 9/2004
CN 103838683 A 6/2014
(Continued)

OTHER PUBLICATIONS

Z. Guan, J. Li, L. Wu, Y. Zhang, J. Wu and X. Du, "Achieving Efficient and Secure Data Acquisition for Cloud-Supported Internet of Things in Smart Grid," in IEEE Internet of Things Journal, vol. 4, No. 6, pp. 1934-1944, Dec. 2017 (Year: 2017).*

*Primary Examiner* — Daniel C. Chappell
(74) *Attorney, Agent, or Firm* — Anova Law Group, PLLC (57) ABSTRACT

The present disclosure provides a method and apparatus for transmitting data, and an electronic device thereof. The method includes identifying a first data object in a first object set in response to transmitting the first object set from a first storage area to a second storage area; and transmitting the first data object to the second storage area to indicate a start of transmission of the first object set from the first storage area to the second storage area.

16 Claims, 2 Drawing Sheets

(58) Field of Classification Search
CPC .............. G06F 2009/45562–45595; G06F 2015/761–768
See application file for complete search history.

(56) References Cited

U.S. PATENT DOCUMENTS

| | | | | |
|---|---|---|---|---|
| 8,316,065 | B2* | 11/2012 | Nemoto | G06F 3/0647 |
| | | | | 707/827 |
| 8,326,798 | B1* | 12/2012 | Driscoll | G06F 3/065 |
| | | | | 707/610 |
| 9,454,532 | B2* | 9/2016 | Powell | G06F 16/188 |
| 9,870,152 | B2* | 1/2018 | Idei | G06F 3/0665 |
| 2006/0136903 | A1* | 6/2006 | Childress | G06F 11/1464 |
| | | | | 717/172 |
| 2006/0259568 | A1* | 11/2006 | Jagathesan | G06F 13/28 |
| | | | | 709/213 |
| 2014/0032566 | A1* | 1/2014 | Agarwal | G06F 16/245 |
| | | | | 707/741 |
| 2018/0176301 | A1* | 6/2018 | Rosier | H04L 67/2823 |

FOREIGN PATENT DOCUMENTS

| | | |
|---|---|---|
| CN | 105072050 A | 11/2015 |
| CN | 107294835 A | 10/2017 |
| JP | 6193104 B2 | 9/2017 |

\* cited by examiner

METHOD AND APPARATUS FOR TRANSMITTING DATA, AND AN ELECTRONIC DEVICE THEREOF

CROSS-REFERENCES TO RELATED APPLICATIONS

This application claims the priority to Chinese Patent Application No. 201810000683.9, entitled "A Method and Apparatus for Transmitting Data, and an Electronic Device Thereof," filed on Jan. 2, 2018, the entire content of which is incorporated herein by reference.

FIELD OF TECHNOLOGY

The present disclosure relates to the field of data processing. More specially, the present disclosure relates to a method and apparatus for transmitting data, and an electronic device thereof.

BACKGROUND

With the continued development of science and technology, electronic devices have brought convenience to people's lives. The importance of these electronic devices has increased both in daily life and in the work environment as people store large amounts of files in electronic devices for entertainment or work purposes.

Currently, when the data stored in one storage area is transferred to another storage area, the order of the data being transferred is often based on the names of the data files to be transferred from one storage area to another storage area. This process does not allow the user to transmit certain data files prior to others.

BRIEF SUMMARY OF THE DISCLOSURE

Embodiments of the present disclosure provide a method and apparatus for transmitting data, and an electronic device thereof, which can intelligently determine the priority of the data being transmitted and prioritize transmission accordingly.

One aspect of the present disclosure provides a method for transmitting data. The method includes identifying a first data object in a first object set in response to transmitting the first object set from a first storage area to a second storage area; and transmitting the first data object to the second storage area to indicate a start of transmission of the first object set from the first storage area to the second storage area.

In one embodiment, identifying the first data object in the first object set when transmitting the first object set from the first storage area to the second storage area includes obtaining a plurality of attributes of a plurality of data objects in the first object set when transmitting the first object set from the first storage area to the second storage area. The first object set may contain two or more data objects, and the first data object in the first object set is identified according to the plurality of attributes.

In one embodiment, transmitting the first data object to the second storage area to indicate a start of transmission of the first set of objects from the first storage area to the second storage area may include transmitting each data object in the first object set to the second storage area. The first object set may contain two or more data objects in a first sequence, and each data objects in the first object set is being transmitted in a second sequence. The first data object may be the first object in the second sequence. The first sequence may be different from the second sequence, or the first data object is not the first data object in the first sequence.

In one embodiment, the method may include identifying the first data object and a second data object, and transmitting the first data object and the second data object to the second storage area to indicate a start of transmission of the first object set from the first storage area to the second storage area.

In one embodiment, the first object set may contain two or more data objects having the first sequence, and transmits each data object in the first object set to the second storage area according to the second sequence. Transmitting the first data object and the second data object to the second storage area includes the step of: maintaining the relative sequence of the first data object and the second data object in the first sequence when transmitting to the second storage area.

In one embodiment, the method may further include obtaining a selection operation set; identifying the first object set according to the selection operation set; and obtaining a transmission operation set to transmit the first object set from the first storage area to the second storage area.

In one embodiment, obtaining the selection operation set may include identifying the first object set and a plurality of priority data objects having the first data object from the first object set according to the selection operation set. The selection operation set includes a first selection operation subset to identify the first object set; a second selection operation subset to identify the plurality of priority data objects in the first object set; or a first selection operation subset to identify a plurality of non-priority data objects; and a second selection operation subset to identify the plurality of priority data objects. The plurality of non-priority data objects and the plurality of priority data objects compose the first object set.

In one embodiment, the attributes may include a usage length or a frequency of use that can be used to identify the first data object in the first object set according to the plurality of attributes. The method may further include obtaining the usage length or the frequency of use of the plurality of data objects in the first object set, and identifying the first data object if the usage length is greater than a first time threshold or the frequency of use is greater than a frequency threshold.

The attributes may further include a last time of use. The method may further include obtaining the last time of use of the plurality of data objects in the first object set, identifying the plurality of data objects to be transmitted if the last time of use is greater than a second time threshold, and identifying the first data object by finding data objects of the same types as the plurality of data objects to be transmitted in the first object set.

The attributes may further include a storage path identifier. The method may further include obtaining the storage path identifier of the plurality of data objects stored in the first storage area in the first object set, and identifying the first data object if the storage path identifier of the plurality of data objects contains a predetermined identifier.

The attributes may further include a selection operation identifier. The method may further include obtaining the selection operation identifier of the plurality of data objects stored in the first storage area in the first object set, and identifying the first data object if the selection operation identifier of the plurality of data objects matches a predetermined selection operation identifier.

Another aspect of the present disclosure provides an apparatus for transmitting data having an identifier wherein the identifier indicates a first data object in a first object set in response to transmitting the first object set from a first storage area to a second storage area; and a transmitter wherein the transmitter transmits the first data object to the second storage area to indicate a start of transmission of the first object set from the first storage area to the second storage area.

Further, the identifier may obtain a plurality of attributes of a plurality of data objects in the first object set in response to the transmitter transmitting the first object set from the first storage area to the second storage area. The first object set may contain two or more data objects. The identifier may indicate the first data object in the first object set corresponding to the plurality of attributes.

In one embodiment, the transmitter may transmit each data object in the first object set to the second storage area. The first object set may contain two or more data objects following a first sequence, each data object in the first object set being transmitted in a second sequence, the first data object being the first object in the second sequence.

In one embodiment, the identifier may indicate the first data object and a second data object; and the transmitter may transmit the first data object and the second data object to the second storage area to indicate the start of transmission of the first object set from the first storage area to the second storage area.

In one embodiment, the first object set may contain two or more data objects in a first sequence; transmitter may transmit each data object in the first object set to the second storage area according to a second sequence; and maintain the relative sequence of the first data object and the second data object in the first sequence while transmitting to the second storage area.

In one embodiment, the identifier may obtain a selection operation set; identify the first object set corresponding to the selection operation set; and obtain a transmission operation set. The transmitter may transmit the first object set from the first storage area to the second storage area based on the transmission operation set.

In one embodiment, the identifier may identify the first object set and a plurality of priority data objects having the first data object in the first object set according to the selection operation set. The selection operation set may include a first selection operation subset to identify the first object set; a second selection operation subset to identify the plurality of priority data objects in the first object set; the first object set including the plurality of non-priority data objects and the plurality of priority data objects.

Another aspect of the present invention provides an electrical device. The electric device includes a processor, and a storage device storing computer program instructions. The processor performs the following operations when executing the computer program instructions: identify a first data object in a first object set in response to transmitting the first object set from a first storage area to a second storage area; and transmit the first data object to the second storage area to indicate a start of transmission of the first object set from the first storage area to the second storage area.

The embodiments of the present disclosure enable priority data objects to be transmitted prior to the other data objects with lower priority in the first object set when transmitting the first object set from the first storage area to the second storage area, by identifying the first data object in the first object set, and transmitting the first data object to the second storage area following a certain sequence.

BRIEF DESCRIPTION OF THE DRAWINGS

For a more complete understanding of the present disclosure, and the advantages thereof, reference is now made to the following descriptions to be taken in conjunction with the accompanying drawings.

DETAILED DESCRIPTION

Hereinafter, aspects, features, and embodiments of the present disclosure will be described with reference to the accompanying drawings. It should be understood that such description is exemplary only but is not intended to limit the scope of the present disclosure. In addition, it will be understood by those skilled in the art that various modifications in form and details may be made therein without departing from the spirit and scope of the present disclosure.

The accompanying drawings illustrating embodiments of the present disclosure along with the summary of disclosure provided above and the detailed description provided below serve to explain the concepts of the present disclosure.

Features and aspects of the present disclosure will become apparent with reference to the accompanying drawings and non-limiting examples describing various preferred embodiments of the present disclosure.

It will also be appreciated that although the present disclosure has been described with reference to some specific examples, equivalents of the present disclosure can be achieved by those skilled in the art. These equivalents having features claimed in the present disclosure should fall within the scope of protection defined hereinafter.

Hereinafter, embodiments of the present disclosure will be described with reference to the accompanying drawings. It should be understood that such description is exemplary only but is not intended to limit the scope of the present disclosure. In addition, in the following description, descriptions of well-known structures and techniques are omitted to avoid unnecessarily obscuring the concepts of the present disclosure. Therefore, specific structural and functional details disclosed herein are not intended to be limiting, but are merely used as a basis of the claims to teach those skilled in the art to use the present disclosure in various combinations.

The terms used herein is for the purpose of describing particular embodiments only but is not intended to limit the present disclosure. The words "a", "an" and "the" as used herein should also cover the meanings of "a plurality of" and "a variety of", unless the context clearly dictates otherwise. In addition, the terms "comprising", "including", "containing" and the like as used herein indicate the presence of the features, steps, operations and/or components, but do not preclude the presence or addition of one or more other features, steps, operations or components.

The phrases "in an embodiment", "in another embodiment", "in another embodiment", or "in other embodiments" may refer to the same or different embodiments accordingly to the present disclosure.

Figure 1:
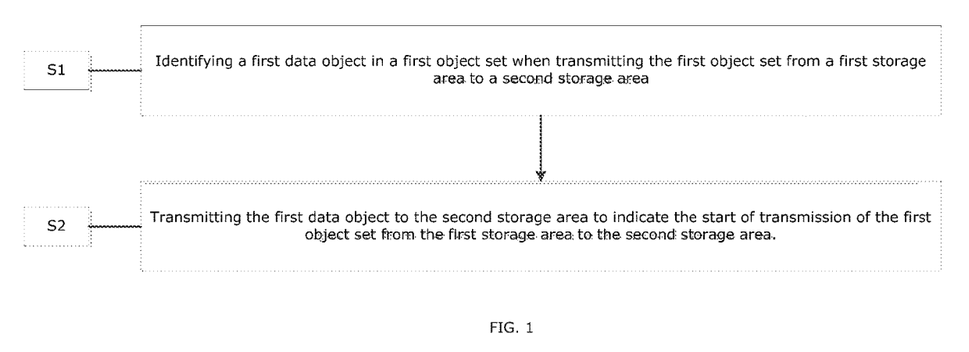
FIG. 1 is a flowchart illustrating a method for transmitting data according to an embodiment of the present disclosure.

FIG. 1 is a flowchart illustrating a method for transmitting data according to an embodiment of the present disclosure.

One embodiment of the present disclosure provides a method for transmitting data. The method includes the following steps.

Step S1, identifying a first data object in a first object set when transmitting the first object set from a first storage area to a second storage area. The first storage area may be different from the second storage area. The first storage area and the second storage area may be two different storage areas in an electronic device, or the first storage area and the second storage area may be located in different electronic devices. The electronic devices having storage areas may be logical devices, such as distributed network disks. The storage areas of the distributed network disks may include multiple storage areas of multiple physical storage devices, so it can be considered as a complete logical device or a physical storage device.

Step S2, transmitting the first data object to the second storage area to indicate a start of transmission of the first object set from the first storage area to the second storage area. Transmitting the first data object to the second storage area may be transmitting the first data object to the first location of the second storage area, when the first location may be located in a physical storage device or a logical device. Transmitting the first data object to the second storage area to indicate a start of transmission of the first object set from the first storage area to the second storage area is the transmission of the first data object of the first object set from the first storage area to the second storage prior to other data objects.

The embodiment described above allows the data object with high priority to be transmitted prior to the other data objects in the first object set when transmitting the first object set from the first storage area to the second storage area. The data object with high priority (priority data object) may be transmitted by identifying the first data object in the first object set, and transmitting the first object set from the first storage area to the second storage area; transmitting the first data object to the second storage area to indicate a start of transmission of the first object set from the first storage area to the second storage area.

In one embodiment of the present disclosure, in Step S2, each data object in the first object set may be transmitted to the second storage area. The first object set may contain two or more data objects in a first sequence. Each data objects in the first object set may be transmitted in a second sequence. Further, in some embodiments, the first data object may be the first object in the second sequence. Furthermore, the first sequence may be different from the second sequence, for example, the first data object may not be the first data object in the first sequence.

For example, the first object set may include four data objects A, B, C, and D, and the first sequence may be ABCD. After identifying the first data object is B, the system for transmitting data may transmit data object B to the second storage area prior to transmitting data objects A, C, and D. The first sequence may be a storage sequence, i.e., a location sequence in which data objects are stored in the hard disks or storage devices of electronic devices. The first sequence may also be a logical naming sequence, i.e., the sequences of data objects in terms of names, time, etc.

In one embodiment of the present disclosure, Step S1 may further include the step of: obtaining a plurality of attributes of a plurality of data objects in the first object set when transmitting the first object set from the first storage area to the second storage area; and determining at least the first data object in the first object set according to the plurality of attributes. Further, the first object set may contain two or more data objects.

The first object set may contain two or more data objects. Obtaining a plurality of attributes of a plurality of data objects in the first object set may be performed over all data objects in the first object set. For example, the first object set may include a second folder, videos, pictures, Word files, and PDF files in a first folder, wherein the second folder may include videos, pictures, Word files, and PDF files. When obtaining the attributes of all data objects in the first folder, the attributes of the data objects in the second folder may not be obtained, and only attributes of the data objects in the first folder can be obtained. That is, the attributes of the data objects obtained is a partial data objects in the first object set. In addition, the first object set may include videos, pictures, Word files, PDF files, and hidden system files such as desktop.ini. Attributes of hidden system files such as desktop.ini may not be available when obtaining the attributes of all data objects in the first object set, therefore, when obtaining the plurality of attributes of the plurality data objects in the first object set, only attributes from non-hidden system files such as desktop.ini may be obtained. In addition, it is also possible to obtain a specific type of data objects according to a policy in the first object set. For example, based on data objects in a predetermined whitelist, obtain attributes of data objects in the first object set in the predetermined whitelist; or based on data objects in a predetermined blacklist, obtain attributes of data objects in the first object set in the predetermined blacklist; or based on data objects in a predetermined blacklist, obtain attributes of data objects in the first object set not in the predetermined blacklist, that is, obtaining attributes of data objects on data objects in the first object set that matches a specific policy.

Obtaining the plurality of attributes of the plurality of data objects in the first object set may be obtaining one attribute of each data object of the plurality of data objects, or, obtaining a plurality of attributes of each data object of the plurality of data objects. Therefore, identifying the first data object in the first object set according to the obtained plurality of attributes, and transmitting the determined first data object from the first storage area to the second storage area prior to other data objects.

In one embodiment of the present disclosure, the method further includes the step of: identifying the first data object and a second data object; transmitting the first data object and the second data object to the second storage area to indicate a start of transmission of the first object set from the first storage area to the second storage area.

The identification of the first data object and a second data object can be based on the plurality of attributes of the plurality of data objects in the first object set.

More specifically, the first data object and second data object may be transmitted to the second storage area prior to transmitting other data objects in the first object set. That is, the data object in the first object set being transmitted from the first storage area to the second storage area may contain a plurality of data objects.

In one embodiment of the present disclosure, the first object set may contain two or more data objects having the first sequence, and each data object in the first object set may be transmitted to the second storage area according to the second sequence. Further, when transmitting the first data object and the second data object to the second storage area, the relative sequence of the first data object and the second data object in the first sequence is maintained.

More specifically, the transmission of the first data object and the second data object may be done prior to transmitting other data objects in the first object set. When transmitting the first data object and the second data object to the second storage area in the second sequence, the relative sequence of the first data object and the second data object should match the first data object and the at least second data object in the first sequence. Other than the first data object and the at least second data object, data objects in the first object set may be transmitted to the second storage area, but only after the transmission of the first data object and the at least second data object. For example, the first object set may include five data objects a, b, c, d, and e, where the first data object and the second data object are b and d. The first sequence may be abcde. The second sequence may be bdace. In addition, if the first sequence is identical to the second sequence, the transmission of each data object in the first object set will be in the first sequence. For example, the first object set includes five data objects a, b, c, d, and e, where the first data object and the second data object are a and b, the first sequence is abcde, and the second sequence is also abcde.

The first data object and the at least second data object are transmitted to the second storage area prior to other data objects in the first object set, and the first data object and the at least second data object may be transmitted in a sequence other than the relative sequence in the first sequence. For example, the first data object and the at least second data object may be transmitted in a random sequence; or, the first data object and the second data object may be sorted according to their attributes and sequentially transmitted to the second storage area. For example, the first data object and the second data object may be transmitted in a sequence according to their frequency of use; or the first data object and the second data object may be transmitted according to a user-defined rule.

When transmitting other data objects in the first object set to the second storage area, these data objects may not be transmitted in the relative sequence in the first sequence. For example, these data objects may be transmitted in a random sequence; or these data objects may be sorted according to their attributes and sequentially transmitted to the second storage area. For example, these data objects may be transmitted in a sequence according to their frequency of use; or these data objects may be transmitted according to a user-defined policy.

The embodiments described above may categorize data objects in the first object set into first and second levels, and transfer these data objects from the first storage area to the second storage area. In addition, data objects in the first object set may be categorized into three levels, four levels, five levels, etc., and the number of levels or categories may be specifically set according to the needs of the user.

The data objects in the first object set are now described in three levels. For example, the system may first identify the first level data objects in the first object set, and data objects not in the first level may be grouped into a second object set. Then the system may identify the second level data objects in the second object set since the data objects in the first object set are categorized into three levels, and data objects not in the second level may be grouped into a third object set. The data objects in the first object set may then be categorized into first level, second level, and third level data objects. Subsequently, the identification of the first level data objects in the first object set, the second level data objects in the second object set, the sequence of transmitting the first level data objects from the first storage area to the second storage area. The sequence of transmitting the second level data objects from the first storage area to the second storage area, and the sequence of transmitting the third level data objects from the first storage area to the second storage area may be similar to those described in relation to the embodiments described above.

According to the example of categorizing the first object set into three levels, it is also possible to categorize the data objects into other levels, and these levels may be determined in a similar manner.

In one embodiment of the present disclosure, the method of transmitting data may further include the steps of: obtaining a selection operation set; identifying the first object set according to the selection operation set; and obtaining a transmission operation set to transmit the first object set from the first storage area to the second storage area.

The selection operation set may be the operations of selecting of at least two data objects. For example, the selection operation set may be the operations of holding the ctrl key to confirm each data object of the at least two data objects, where the selection operation set includes holding the ctrl key and at least two confirm operations; or the operations of holding the shift key to confirm a first data object and a last data object of the at least two data objects. The selection operation set includes holding the shift key and at least two confirm operations; or a one-time selection of at least two data objects by holding the left mouse button and dragging the mouse to select at least two data objects. The selection operation set may include holding the left mouse button and selecting at least two data objects, the operations of applying a long press or a voice command to each data objects of the at least two data objects, and/or the operation of selecting a folder to confirm the selection of at least two data objects in the folder.

The identification of the first object set according to the selection operation set may include the steps of confirming two or more data objects according to the operations of the selection operation set, then identify the first object set.

The transmission operation set obtained may be used to transmit the first object set from the first storage area to the second storage area. Based on the transmission operation set, the identified first object set may be transmitted according to the selection operation set from the first storage area to the second storage area. The transmission operation set can include the copy operation or the cut operation, and the paste operation of the at least two data objects in the first object set to confirm the target area; or the transmission operation set can include the right mouse button operation and the "Sent to" operation to the two or more data objects identified in the first object set; or the transmission operation set can include shortcut operations such as "Click to upload" operation to the two or more data objects identified in the first object set.

The selection operations to identify the first object set in the selection operation set and the transmission operations to transmit the identified first object set from the first storage area to the second storage area may be operations initiated by the user. For example, the user may initiate these operations through mediums such as fingers, mouse, keyboard, voice commands, etc., and the selection operation set and the transmission operation set can be established to identify the first object set and transmit the first object from the first storage area to the second storage area.

In one embodiment of the present disclosure, obtaining the selection operation set may further include the step of: identifying the first object set and a plurality of priority data objects having the first data object in the first object set according to the selection operation set. The selection operation set may include: a first selection operation subset to identify the first object set; and a second selection operation subset to identify the plurality of priority data objects in the first object set; or a first selection operation subset to identify a plurality of non-priority data objects; and a second selection operation subset to identify the plurality of priority data objects. Further, the plurality of non-priority data objects and the plurality of priority data objects compose the first object set.

The first object set and the plurality of priority data objects in the first object set may be identified according to the selection operation set. The selection operation set may further include: the first selection operation subset to identify the first object set; and the second selection operation subset to identify the plurality of priority data objects in the first object set. More specifically, the first selection operation subset to identify the first object set may be the first selection operation subset composed of the operations performed in a first mode, and identify the plurality of priority data objects in the first object set in a second mode. The operations in the second mode may compose the second selection operation set. The operations in the first and second modes can be the same or different. The operations in the first and second modes can be any operations such as touch operations, voice operations, where touch operations can be, for example, a one-finger operation, a two-finger operation, a short-press operation, a long-press operation, a light-pressure operation, a high-pressure operation, or touch operation that correspond to fingerprints from different fingers. For example, when the first and second modes are both long-press operations, the user may use the first long-press operation to select the first object set and the second long-press operation to select the priority data objects. More specifically, after selecting the first object set using the first long-press operation, the user may be prompted to select data objects in the first object set again. When the user selects the data objects using the long-press operation again, priority data objects can be identified as the second long-press operation can be considered as the second selection operation subset. In another example, when the first and second modes are different, the user can use the one-finger operation to select the first object set and the two-finger operation to select the priority data objects, where the one-finger operation composes the first selection operation subset to identify the first object set and the two-finger operation composes the second selection operation subset to identify the priority data objects.

In some embodiments, the first object set and the plurality of priority data objects in the first object set may be identified according to the selection operation set. A first selection operation subset may be used to identify the plurality of non-priority data objects; a second selection operation subset may be used to identify the plurality of priority data objects. The plurality of non-priority data objects and the plurality of priority data objects compose the first object set. More specifically, the first selection operation subset to identify the plurality of non-priority data objects may be the first selection operation subset composed of the operations performed in the first mode, and the second selection operation subset to identify the plurality of priority data objects in the first object set may be the second selection operation subset composed of the operations performed in the second mode, and the first and second modes are different. The first and second modes can be performed on different operating mediums by different types of operation. For example, using the touch operations to identify the non-priority data objects and the voice operations to identify the plurality of priority data objects, where the touch operations compose the first selection operation subset and the voice operations compose the second selection operation subset; or using the combination of touch and voice operations to identify the non-priority data objects and the touch operations to identify the plurality of priority data objects. The combination of touch and voice operations may compose the first selection operation subset and the touch operations compose the second selection operation subset. The first and second modes can be performed on the same operating mediums by different types of operation, for example, using the one-finger operations to identify the non-priority data objects and the two-finger operations to identify the plurality of priority data objects, where the one-finger operations compose the first selection operation subset and the two-finger operations compose the second selection operation subset; or using the fingerprint of a first finger to identify the non-priority data objects and the fingerprint of a second finger to identify the plurality of priority data objects, where the fingerprint of the first finger composes the first selection operation subset and the fingerprint of the second finger compose the second selection operation subset.

In addition, the first and second modes can be performed by different types of operation. For example, using the short-press operations to identify the non-priority data objects and the long-press operations to identify the plurality of priority data objects, where the short-press operations may make up the first selection operation subset and the long-press operations may make up the second selection operation subset; or using the combination of touch and light-pressure operations to identify the non-priority data objects and the combination of touch and high-pressure operations to identify the plurality of priority data objects, where the combination of touch and light-pressure operations compose the first selection operation subset and the combination of touch and high-pressure operations compose the second selection operation subset. In the examples above, the operations performed in the first and second modes are interchangeable.

In one embodiment of the present disclosure, the method of transmitting data may further include the step of: identifying the first data object and at least the second data object in the first object set according to the plurality of attributes. Specifically, the following embodiments are included.

In one embodiment of the present disclosure, the attributes may include a usage length or a frequency of use. In this case, identifying the first data object in the first object set according to the plurality of attributes may include the steps of: obtaining the usage length or the frequency of use of the plurality of data objects in the first object set, and identifying the first data object if the usage length is greater than a first time threshold or the frequency of use is greater than a frequency threshold.

For example, the first object set may include five data objects A, B, C, D, and E. The usage lengths of the data objects may be 3 minutes, 5 minutes, 30 minutes, 6 minutes, and 2 minutes, respectively, and the first time threshold may be 10 minutes. When comparing the usage lengths of the five data objects to the first time threshold, data object C is identified to be the first data object and will be transmitted from the first storage to the second storage area prior to data objects A, B, D, and E. The example of the frequency of use is similar to the usage length, and will not be described here.

In another example, the first object set may include five data objects A, B, C, D, and E. The usage lengths of the data objects in one month may be 3 hours, 5 hours, 30 hours, 20 hours, and 2 hours, respectively, and the first time threshold may be 10 hours. When comparing the usage lengths of the five data objects to the first time threshold, the usage lengths of data objects C and D may both be greater than the first time threshold. If the frequencies of use for data object C and D are 10 times per month and 1 time per month, respectively, and the frequency threshold is 5 times per month, then data object C may be identified to be the first data object since it is the only data object having the frequency of use greater than the frequency threshold.

Or, in one embodiment of the present disclosure, the attributes may include a last time of use. In this case, identifying the first data object in the first object set according to the plurality of attributes may include the steps of: obtaining the last time of use of the plurality of data objects in the first object set, identifying the plurality of data objects to be transmitted if the last time of use is greater than a second time threshold, and identifying the first data object by finding data objects of the same types as the plurality of data objects to be transmitted in the first object set.

For example, the first object set may include five data objects A, B, C, D, and E. The last days of use in November may be the 11th, 15th, 2nd, 28th, and 5th, respectively, and the second time threshold is set to be 15 days. When comparing the last days of use of the five data objects to the second time threshold, only data object D's last day of use is greater than the second time threshold, so data object D may be identified to be the data object to be transmitted and the first data object. If data objects A, B, and D are identified to be of the same type, such as video data objects, then data objects A and B may be identified to be the second data objects, and data objects A, B, and D will be transmitted from the first storage to the second storage area prior to data objects C and E.

In one embodiment of the present disclosure, the attributes may include a storage path identifier. In this case, identifying the first data object in the first object set according to the plurality of attributes may include the steps of: obtaining the storage path identifier of the plurality of data objects stored in the first storage area in the first object set, and identifying the first data object if the storage path identifier of the plurality of data objects contains a predetermined identifier.

For example, data object A's storage path identifier may be c:\downloads\movie.avi. Other data objects' storage path identifier may be c:\backup\movie.avi. The predetermined identifier may be downloads. In this case, data object A may be identified to be the first data object.

In some embodiments of the present disclosure, the attributes may include a selection identifier. In this case, identifying the first data object in the first object set according to the plurality of attributes may include the steps of: obtaining the selection identifier of the plurality of data objects stored in the first storage area in the first object set, and identifying the first data object if the selection identifier of the plurality of data objects matches a predetermined selection identifier.

The selection identifier may be determined through user initiated operations, and data objects whose selection identifier match the predetermined selection identifier may be identified to be the first data object, that is, user can initiate the operations to select certain data objects in the first object set to be the first data objects and transmit the selected first data objects prior to other data objects.

For example, a user may use the touch operations to select the first object set, then use the touch operations to select the priority data objects, where the priority data objects include the first data object. If the predetermined selection identifier is the second touch operations, data objects whose selection identifier includes the second touch operations may be identified to be the first data objects in the first object set.

In another example, use the one-finger operations to select the non-priority data objects, and the two-finger operations to select the priority data objects, where the priority data objects include the first data object. If the predetermined selection identifier is the two-finger operations, data objects having the one-finger operations and the two-finger operations as their attributes are identified to be the first object set, and data objects whose selection identifier includes the two-finger operations are identified to be the first data objects.

Figure 2:
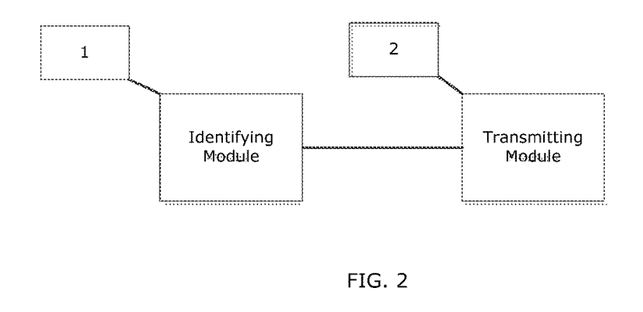
FIG. 2 is a block diagram illustrating the structure of an apparatus for transmitting data according to an embodiment of the present disclosure.

As shown in FIG. 2, another aspect of the present disclosure provides an apparatus for transmitting data having an identifying module 1 to determine a first data object in a first object set when transmitting the first object set from a first storage area to a second storage area; and a transmission module 2 to transmit the first data object to the second storage area to indicate a start of transmission of the first object set from the first storage area to the second storage area. In the present disclosure, the identifying module 1 may be referred as an identifier which identifies certain data objects. In the present application, a module, such as an identifying module 1, may refer to one or more computer program instructions stored in a computer readable medium. When executed by one or more processors, the computer program instructions perform the corresponding functions. In some embodiments, the computer program instructions may perform the corresponding functions together with other hardware components.

In one embodiment, the identifying module 1 obtains a plurality of attributes of a plurality of data objects in the first object set when transmitting the first object set from the first storage area to the second storage area. The first object set may contain two or more data objects. In addition, identifying module 1 identifies the first data object in the first object set according to the plurality of attributes.

In one embodiment, the transmission module 2 transmits each data object in the first object set to the second storage area. The first object set may contain two or more data objects in a first sequence, and each data objects in the first object set may be transmitted in a second sequence. Further, the first data object may be the first object in the second sequence. Furthermore, the first sequence may be different from the second sequence, or the first data object may not be the first data object in the first sequence. In the present disclosure, the transmission module 2 may be referred as transmitter which transmits data objects.

In one embodiment, the identifying module 1 may identify the first data object and the second data object, and the transmission module 2 may transmit the first data object and the second data object to the second storage area to indicate a start of transmission of the first object set from the first storage area to the second storage area.

In one embodiment, the transmission module 2 may transmit each data object in the first object set to the second storage area according to the second sequence and the first object set contains at least two data objects having the first sequence. Transmission module 2 may further maintain the relative sequence of the first data object and the second data object in the first sequence when transmitting them to the second storage area.

In one embodiment, the identifying module 1 may obtain a selection operation set, identify the first object set according to the selection operation set, and obtain a transmission operation set to transmit the first object set from the first storage area to the second storage area.

In one embodiment, the determining module 1 may obtain the selection operation set, and identify the first object set and a plurality of priority data objects having the first data object in the first object set according to the selection operation set. The selection operation set may include: a first selection operation subset to identify the first object set; and a second selection operation subset to identify the plurality of priority data objects in the first object set; or a first selection operation subset to identify a plurality of non-priority data objects; and a second selection operation subset to identify the plurality of priority data objects. Further, the plurality of non-priority data objects and the plurality of priority data objects may make up the first object set.

In one embodiment, the plurality of attributes the identifying module 1 obtains may include a usage length or a frequency of use that can be used to identify the first data object in the first object set according to the plurality of attributes. Identifying module 3 may obtain the usage length or the frequency of use of the plurality of data objects in the first object set, and identify the first data object if the usage length is greater than a first time threshold or the frequency of use is greater than a frequency threshold.

The plurality of attributes identifying module 1 obtains may further include a last time of use. Identifying module 3 may obtain the last time of use of the plurality of data objects in the first object set, identify the plurality of data objects to be transmitted if the last time of use is greater than a second time threshold, and identify the first data object by finding data objects of the same types as the plurality of data objects to be transmitted in the first object set.

The plurality of attributes identifying module 1 obtains may further include a storage path identifier. Identifying module 3 may obtain the storage path identifier of the plurality of data objects stored in the first storage area in the first object set, and identify the first data object if the storage path identifier of the plurality of data objects contains a predetermined identifier.

The plurality of attributes identifying module 1 obtains may further include a selection operation identifier. Identifying module 3 may obtain the selection operation identifier of the plurality of data objects stored in the first storage area in the first object set, and identify the first data object if the selection operation identifier of the plurality of data objects matches a predetermined selection operation identifier.

Figure 3:
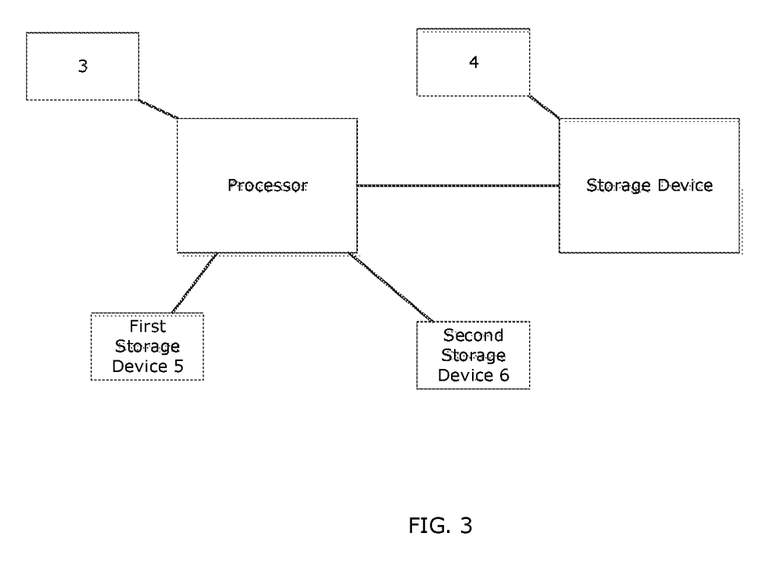
FIG. 3 is a block diagram illustrating an electronic device according to an embodiment of the present disclosure.

As shown in FIG. 3, another aspect of the present disclosure provides an electronic device having a processor 3 and a storage device 4. The storage device 4 may store executable computer program instructions, and the processor 3 may perform the following operations when executing the executable computer program instructions: identify a first data object in a first object set when transmitting the first object set from a first storage area 5 to a second storage area 6; and transmit the first data object to the second storage area 6 to indicate a start of transmission of the first object set from the first storage area 5 to the second storage area 6.

In one embodiment, processor 3 may obtain a plurality of attributes of a plurality of data objects in the first object set when transmitting the first object set from the first storage area 5 to the second storage area 6. The first object set may contain two or more data objects. In addition, processor 3 identifies the first data object in the first object set according to the plurality of attributes.

In one embodiment, processor 3 may transmit each data object in the first object set to the second storage area 6. The first object set may contain two or more data objects in a first sequence, and each data objects in the first object set may be transmitted in a second sequence. Further, the first data object may be the first object in the second sequence. Furthermore, the first sequence may be different from the second sequence, that is, the first data object would not be the first object in the first sequence.

In one embodiment, processor 3 may identify the first data object and the second data object, and transmit the first data object and the second data object to the second storage area 6 to indicate a start of transmission of the first object set from the first storage area 5 to the second storage area 6.

In one embodiment, processor 3 may transmit each data object in the first object set to the second storage area 6 according to the second sequence, and the first object set may include at least two data objects having the first sequence. Processor 3 may further maintain the relative sequence of the first data object and the second data object in the first sequence when transmitting them to the second storage area 6.

In one embodiment, prior to transmitting the first object set from the first storage area to the second storage area, processor 3 may obtain a selection operation set, identify the first object set according to the selection operation set; and obtain a transmission operation set to transmit the first object set from the first storage area to the second storage area 6.

In one embodiment, processor 3 may obtain the selection operation set, and identify the first object set and a plurality of priority data objects having the first data object in the first object set according to the selection operation set. The selection operation set may include: a first selection operation subset to identify the first object set; and a second selection operation subset to identify the plurality of priority data objects in the first object set; or a first selection operation subset to identify a plurality of non-priority data objects; and a second selection operation subset to identify the plurality of priority data objects. Further, the plurality of non-priority data objects and the plurality of priority data objects may make up the first object set.

In one embodiment, the plurality of attributes processor 3 obtains may include a usage length or a frequency of use that can be used to identify the first data object in the first object set according to the plurality of attributes. Process 3 may obtain the usage length or the frequency of use of the plurality of data objects in the first object set, and identify the first data object if the usage length is greater than a first time threshold or the frequency of use is greater than a frequency threshold.

The plurality of attributes processor 3 obtains may further include a last time of use. Process 3 may obtain the last time of use of the plurality of data objects in the first object set, identify the plurality of data objects to be transmitted if the last time of use is greater than a second time threshold, and identify the first data object by finding data objects of the same types as the plurality of data objects to be transmitted in the first object set.

The plurality of attributes processor 3 obtains may further include a storage path identifier. Process 3 may obtain the storage path identifier of the plurality of data objects stored in the first storage area in the first object set, and identify the first data object if the storage path identifier of the plurality of data objects contains a predetermined identifier.

The plurality of attributes processor 3 may obtain the selection operation identifier of the plurality of data objects stored in the first storage area 5 in the first object set, and identify the first data object if the selection operation identifier of the plurality of data objects matches a predetermined selection operation identifier.

It will be understood by those skilled in the art that the features described in the respective embodiments and/or claims of the present disclosure can be combined in various ways, even if such combinations are not explicitly described in the present disclosure. In particular, without departing from the spirit and teaching of the present disclosure, the features described in the respective embodiments and/or claims can be combined in various ways. All of these combinations fall within the scope of the present disclosure.

While the present disclosure has been shown and described with reference to various embodiments thereof, it will be understood by those skilled in the art that various modifications in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

It should be noted that the description of the foregoing embodiments of the electronic device may be similar to that of the foregoing method embodiments, and the device embodiments have the same beneficial effects as those of the method embodiments. Therefore, details may not be described herein again. For technical details not disclosed in the embodiments of the electronic device of the present disclosure, those skilled in the art may understand according to the method embodiments of the present disclosure.

In the several embodiments provided in the present disclosure, it should be understood that the disclosed device and method may be realized in other manners. The device embodiments described above are merely exemplary. All functional modules or units in the embodiments of the present disclosure may all be integrated in one processing unit, or each unit may be used as a single unit. Two or more units may be integrated in one. The above integrated unit can either be implemented in the form of hardware, or in the form of hardware combined with software functional units.

Persons of ordinary skill in the art should understand that, all or a part of steps of implementing the foregoing method embodiments may be implemented by related hardware of an computer instruction program. The instruction program may be stored in a computer-readable storage medium, and when executed, a processor executes the steps of the above method embodiments as stated above. The foregoing storage medium may include various types of storage media, such as a removable storage device, a read only memory (ROM), a random-access memory (RAM), a magnetic disk, or any media that stores program code.

Alternatively, when the above-mentioned integrated units of the present disclosure are implemented in the form of a software functional module being sold or used as an independent product, the integrated unit may also be stored in a computer-readable storage medium. Based on this understanding, the technical solutions provided by the embodiments of the present disclosure essentially or partially may be embodied in the form of a software product stored in a storage medium. The storage medium stores instructions which are executed by a computer device (which may be a personal computer, a server, a network device, or the like) to realize all or a part of the embodiments of the present disclosure. The above-mentioned storage medium may include various media capable of storing program codes, such as a removable storage device, a read only memory (ROM), a random-access memory (RAM), a magnetic disk, or an optical disk.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

The foregoing descriptions are merely embodiments of the present disclosure, and the protection scope of the present disclosure is not limited thereto. The scope that anyone skilled in the art may easily conceive changes and substitutions within the technical scope disclosed in the present disclosure that should be covered by the present disclosure. Therefore, the protection scope of the present disclosure should be subject to the scope of the claims as listed in the following.

Other embodiments of the disclosure will be apparent to those skilled in the art from consideration of the specification and practice of the disclosure provided herein. It is intended that the specification and examples be considered as exemplary only, with a true scope and spirit of the disclosure being indicated by the claims.

What is claimed is:

1. A method for transmitting data, comprising:
   obtaining a plurality of attributes of a plurality of data objects in a first object set, the plurality of data objects in the first object set forming a first sequence, the first sequence being a storing sequence or a naming sequence, and the first object set being stored in a first storage area;
   identifying a first data object in the first object set according to the plurality of attributes;
   transmitting the first data object from the first storage area to a second storage area to indicate a start of transmission of the first object set from the first storage area to the second storage area; and
   transmitting each data object in the first object set to the second storage area in a second sequence, the first data object being a starting object in the second sequence, and the second sequence being different from the first sequence;
   wherein:
   the first object set includes a first file folder and a second file folder, the plurality of data objects includes a first plurality of data objects stored in the first file folder and a second plurality of data objects stored in the second file folder; and
   the plurality of attributes are only obtained from the first plurality of data objects stored in the first file folder and not from the second plurality of data objects stored in the second file folder.

2. The method according to claim 1, comprising:
   identifying the first data object and a second data object;
   transmitting the first data object and the second data object to the second storage area to indicate the start of transmission of the first object set from the first storage area to the second storage area.

3. The method according to claim 2, further comprising:
   maintaining a relative order of the first data object and the second data object in the first sequence while transmitting to the second storage area.

4. The method according to claim 1, further comprising:
   obtaining a selection operation set;

identifying the first object set corresponding to the selection operation set; and obtaining a transmission operation set; and transmitting the first object set from the first storage area to the second storage area based on the transmission operation set.

5. The method according to claim 4, further comprising:

identifying the first object set and a plurality of priority data objects having the first data object in the first object set according to the selection operation set;

wherein the selection operation set comprising:

a first selection operation subset to identify a plurality of non-priority data objects;

a second selection operation subset to identify the plurality of priority data objects; the first object set including the plurality of non-priority data objects and the plurality of priority data objects.

6. The method of claim 1, wherein the attributes include a usage length or a frequency of use, the method further comprising:

obtaining one of the usage length or the frequency of use for the plurality of data objects in the first object set; and identifying a data object as the first data object if the usage length of the data object is greater than a first time threshold or the frequency of use is greater than a frequency threshold.

7. The method of claim 1, wherein the attributes include a last time of use, the method further comprising:

obtaining a last time of use for each of the plurality of data objects in the first object set; and identifying a data object as a data object to be transmitted in response to the last time of use of the data object is greater than a second time threshold, and identifying the first data object by finding a data object of a same type as the data object to be transmitted in the first object set.

8. The method of claim 7, wherein the attributes include a storage path identifier, the method further comprising:

obtaining the storage path identifier of each of the plurality of data objects in the first object set; and identifying a data object as the first data object in response to the storage path identifier of the data object containing a preconfigured identifier.

9. The method of claim 1, wherein the attributes include a selection operation identifier, the method further comprising:

obtaining a selection operation identifier of each of the plurality of data objects in the first object set; and identifying a data object as the first data object if the selection operation identifier of the data object matches a selected selection operation identifier.

10. An electronic device, comprising:

a processor; and a storage device storing computer program instructions;

wherein the processor is configured to perform the following operations when executing the computer program instructions:

obtaining a plurality of attributes of a plurality of data objects in a first object set, the plurality of data objects in the first object set forming a first sequence, the first sequence being a storing sequence or a naming sequence, and the first object set being stored in a first storage area;

identifying a first data object in the first object set according to the plurality of attributes;

transmitting the first data object from the first storage area to a second storage area to indicate a start of transmission of the first object set from the first storage area to the second storage area; and transmitting each data object in the first object set to the second storage area in a second sequence, the first data object being a starting object in the second sequence, and the second sequence being different from the first sequence;

wherein:

the first object set includes a first file folder and a second file folder, the plurality of data objects includes a first plurality of data objects stored in the first file folder and a second plurality of data objects stored in the second file folder; and the plurality of attributes are only obtained from the first plurality of data objects stored in the first file folder and not from the second plurality of data objects stored in the second file folder.

11. The electronic device according to claim 10, wherein the processor is further configured to perform:

identifying the first data object and a second data object;

transmitting the first data object and the second data object to the second storage area to indicate the start of transmission of the first object set from the first storage area to the second storage area.

12. The electronic device according to claim 11, wherein the processor is further configured to perform:

maintaining a relative order of the first data object and the second data object in the first sequence while transmitting to the second storage area.

13. The electronic device according to claim 10, wherein the processor is further configured to perform:

obtaining a selection operation set;

identifying the first object set corresponding to the selection operation set; and obtaining a transmission operation set; and transmitting the first object set from the first storage area to the second storage area based on the transmission operation set.

14. The electronic device according to claim 13, wherein the processor is further configured to perform:

identifying the first object set and a plurality of priority data objects having the first data object in the first object set according to the selection operation set;

wherein the selection operation set comprising:

a first selection operation subset to identify a plurality of non-priority data objects; and a second selection operation subset to identify the plurality of priority data objects;

wherein the first object set includes the plurality of non-priority data objects and the plurality of priority data objects.

15. The electronic device according to claim 10, wherein the attributes include a usage length or a frequency of use, and the processor is further configured to perform:

obtaining one of the usage length or the frequency of use for the plurality of data objects in the first object set; and identifying a data object as the first data object if the usage length of the data object is greater than a first time threshold or the frequency of use is greater than a frequency threshold.

16. The electronic device according to claim 10, wherein the attributes include a last time of use, and the processor is further configured to perform:

obtaining a last time of use for each of the plurality of data objects in the first object set; and identifying a data object as a data object to be transmitted in response to the last time of use of the data object is greater than a second time threshold, and identifying the first data object by finding a data object of a same type as the data object to be transmitted in the first object set.

\* \* \* \* \*